United States Patent
Nivala et al.

(10) Patent No.: US 9,053,334 B2
(45) Date of Patent: Jun. 9, 2015

(54) METHOD AND A TECHNICAL EQUIPMENT FOR CONTROLLING METADATA ACCESS

(71) Applicant: M-Files Oy, Tampere (FI)

(72) Inventors: Antti Nivala, Pirkkala (FI); Markku Laitkorpi, Tampere (FI)

(73) Assignee: M-FILES OY, Tampere (FI)

(*) Notice: Subject to any disclaimer, the term of this patent is extended or adjusted under 35 U.S.C. 154(b) by 0 days.

(21) Appl. No.: 13/630,329

(22) Filed: Sep. 28, 2012

(65) Prior Publication Data

US 2014/0096265 A1  Apr. 3, 2014

(51) Int. Cl.
  *G06F 21/62* (2013.01)
  *G06Q 10/10* (2012.01)

(52) U.S. Cl.
  CPC ............ *G06F 21/6209* (2013.01); *G06Q 10/10* (2013.01)

(58) Field of Classification Search
  CPC ...................... G06F 21/6209; G06Q 10/10
  USPC .......................................................... 726/28
  See application file for complete search history.

(56) References Cited

U.S. PATENT DOCUMENTS

| | | | | |
|---|---|---|---|---|
| 2002/0088000 A1* | 7/2002 | Morris | ............... | 725/105 |
| 2004/0143836 A1* | 7/2004 | McCormack et al. | ......... | 719/316 |
| 2005/0114661 A1* | 5/2005 | Cheng et al. | ................... | 713/167 |

FOREIGN PATENT DOCUMENTS

EP   2 437 199 A2   4/2012

* cited by examiner

*Primary Examiner* — Dant Shaifer Harriman
(74) *Attorney, Agent, or Firm* — Ware, Fressola, Maguire & Barber LLP (57) ABSTRACT

A method for controlling access to metadata or a property in metadata of an electronic object comprises receiving a request from an identified user to access metadata of an electronic object; determining one or more pseudo-users that are allowed to access the requested metadata of the electronic object and their corresponding access modes; retrieving at least one person identity by utilizing at least one property value of one or more properties of the electronic object, which one or more properties correspond to the determined one or more pseudo-users; comparing the identity of the requesting identified user to the retrieved person identities, and if there is a match; providing to the requesting identified user an access to selected properties in the metadata, which selected properties are determined according to the access mode. The invention also relates to a method for defining access to metadata of an electronic object.

33 Claims, 6 Drawing Sheets

PROPERTY PERMISSIONS FOR "PERSON" — 300

| | Property | PERMISSIONS | |
|---|---|---|---|
| | | READ | EDIT |
| ☐ | Name: | ALL | HR-TEAM |
| ☑ | Birthday: | [EMPLOYEE], [SUPERVISOR] | Andy N, HR-TEAM |
| ☐ | Address: | [EMPLOYEE], [SUPERVISOR] | [EMPLOYEE] |
| ☐ | Team: | ALL | [TEAM].[TEAM MANAGER] |
| ☐ | Project: | ALL | [TEAM].[TEAM MANAGER] |

303

Permissions — 305

OK    Cancel

METHOD AND A TECHNICAL EQUIPMENT FOR CONTROLLING METADATA ACCESS

FIELD OF THE INVENTION

The present invention generally relates to metadata and in particular to controlling rights to access metadata.

BACKGROUND

Enterprise Content Management (ECM) system refers to a system organizing and storing an organization's electronic documents and other business-related objects and/or content. ECM system may comprise content management systems (CMS), document management systems (DMS) and data management systems. Such systems comprise various features for managing electronic documents, e.g. storing, versioning, indexing, searching for and retrieval of documents. It is appreciated that there are both dynamic and static content management systems. The difference between dynamic and static systems is the way they store files. In the static systems files are stored e.g. in a constant treelike hierarchy that defines relationships for folders and documents stored in the tree. In the dynamic systems the files may be given identifications that define their existence in the system. The location of the files is not constant, but may vary in a virtual space depending on the situation.

In the enterprise content management system, electronic objects, such as documents, are associated with metadata. "Metadata" refers to information on document's properties. For example, a creator of the file or a creation date may represent content of the metadata. In addition to the metadata, the document may also comprise version history and reference information to other documents.

As said, "metadata" refers to information on a document's properties. Metadata is composed of two parts—a definition part and a content part. The definition part of a property defines generally the type of property; client, project, customer, creator, date, etc. The definition part of a property may additionally comprise data type (such as text, number, date, time, Boolean, choose from list single-select, choose from list multi-select), sorting order, validation rules, automatic value calculation rules, access control information and other information that the system may need in association with the use of the property in question. The content part of a property on the other hand specifies the value of the metadata, i.e. which client ("BeefEaters Ltd"), which project ("BBQ party"), which customer ("Edvin Tournedous"), which creator ("John Leaderman"), which date ("20120801"). For further example, specified values for a creator of the file or a creation date represent content of the metadata. In addition, a project which the document belongs to; a client who owns the document; a type of the document (letter, assignment, publication, order etc.); name of the document are examples of the content of metadata. Despite the plural form of metadata, in this disclosure, the term metadata may also refer to a singular form. Therefore, an object being defined by "metadata" may in practice be defined by one or more pieces (i.e. property or properties) of metadata. In the present disclosure, term "properties" is used as a synonym for metadata, wherein "a property" is a piece of a metadata. Further, the term "property definition" refers to the definition part of a property, and the term "property value" refers to the content part of a property. The term "property" may refer to either the definition part or the content part, or both.

It is appreciated that an object comprises a set (i.e. collection/selection/combination) of properties. Such a set of properties may vary from object to object, meaning that each object may comprise different pieces of metadata (i.e. properties) defining such object. For example, a certain document object called "plan.doc" may comprise metadata having set of properties "name", "creator", "state". Another document object called "manuscript.rtf" may comprise metadata having set of properties "name", "author", "publisher", "advertiser", "proofreader". A certain project object called "client meeting" may comprise metadata having more than one "client" properties and properties for "date", "project manager" and "location". Metadata is thus a combination of properties for an object.

SUMMARY

Now there has been invented an improved method and technical equipment implementing the method, by which metadata (i.e., properties) can be defined and viewed in a more controlled manner e.g. in an ECM system. Various aspects of the invention include a method, an apparatus and a computer readable medium comprising a computer program stored therein, which are characterized by what is stated in the independent claims. Various embodiments of the invention are disclosed in the dependent claims.

According to a first aspect, a method for controlling access to metadata of an electronic object comprises receiving a request from an identified user to access metadata of an electronic object; determining one or more pseudo-users that are allowed to access the requested metadata of the electronic object and their corresponding access modes; retrieving at least one person identity by utilizing at least one property value of one or more properties of the electronic object, which one or more properties correspond to the determined one or more pseudo-users; comparing the identity of the requesting identified user to the retrieved person identities, and if there is a match; providing to the requesting identified user an access to selected properties in the metadata, which selected properties are determined according to the access mode.

According to a second aspect, a method for controlling access to metadata of an electronic object, comprises receiving a request from an identified user to access a property in metadata of an electronic object; determining one or more pseudo-users that are allowed to access the requested property in metadata of the electronic object and their corresponding access modes; retrieving at least one person identity by utilizing at least one property value of one or more properties of the electronic object, which one or more properties correspond to the determined one or more pseudo-users; comparing the identity of the requesting identified user to the retrieved person identities, and if there is a match; providing to the requesting identified user an access to the requested property according to the access mode.

According to a third aspect, a method for defining access to metadata of an electronic object, comprises defining access settings for at least one individual property of metadata, wherein defining the access settings comprises specifying one or more pseudo-users that are allowed to access said individual property of the metadata and an access mode to said individual property of the metadata.

According to a fourth aspect an apparatus comprises computer program code configured to, with a processor, cause the apparatus to perform at least the following: receiving a request from an identified user to access metadata of an electronic object; determining one or more pseudo-users that are allowed to access the requested metadata of the electronic object and their corresponding access modes; retrieving at least one person identity by utilizing at least one property value of one or more properties of the electronic object, which one or more properties correspond to the determined one or more pseudo-users; comparing the identity of the requesting identified user to the retrieved person identities, and if there is a match; providing to the requesting user an access to selected properties of the metadata which selected properties are determined according to the access mode.

According to a fifth aspect, an apparatus comprises computer program code configured to, with a processor, cause the apparatus to perform at least the following: receiving a request from an identified user to access a property in metadata of an electronic object; determining one or more pseudo-users that are allowed to access the property in metadata of the electronic object and their corresponding access modes; retrieving at least one person identity by utilizing at least one property value of one or more properties of the electronic object, which one or more properties correspond to the determined one or more pseudo-users; comparing the identity of the requesting identified user to the retrieved person identities, and if there is a match; providing to the requesting identified user an access to the requested property according to the access mode.

According to a sixth aspect, an apparatus comprises computer program code configured to, with a processor, cause the apparatus to perform at least the following: defining access settings for individual properties of metadata, wherein defining the access settings comprises specifying one or more pseudo-users that are allowed to access said individual property of the metadata and an access mode to said individual property of the metadata.

According to a seventh aspect, a computer program product embodied on a non-transitory computer readable medium, comprising computer program code configured to, when executed on at least one processor, cause an apparatus or a system to: receive a request from an identified user to access metadata of an electronic object; determine one or more pseudo-users that are allowed to access the requested metadata of the electronic object and their corresponding access modes; retrieve at least one person identity by utilizing at least one property value of one or more properties of the electronic object, which one or more properties correspond to the determined one or more pseudo-users; compare the identity of the requesting identified user to the retrieved person identities, and if there is a match; provide to the requesting identified user an access to selected properties in the metadata, which selected properties are determined according to the access mode.

According to an eighth aspect, a computer program product embodied on a non-transitory computer readable medium, comprising computer program code configured to, when executed on at least one processor, cause an apparatus or a system to: receive a request from an identified user to access a property in metadata of an electronic object; determine one or more pseudo-users that are allowed to access the requested property in metadata of the electronic object and their corresponding access modes; retrieve at least one person identity by utilizing at least one property value of one or more properties of the electronic object, which one or more properties correspond to the determined one or more pseudo-users; compare the identity of the requesting identified user to the retrieved person identities, and if there is a match; provide to the requesting identified user an access to the requested property according to the access mode According to a ninth aspect, a computer program product embodied on a non-transitory computer readable medium, comprising computer program code configured to, when executed on at least one processor, cause an apparatus or a system to: define access settings for individual properties of metadata, wherein defining the access settings comprises specifying one or more pseudo-users that are allowed to access said individual property of the metadata and an access mode to said individual property of the metadata.

According to an embodiment, the access mode defines at least one of the following: read access to a property, edit access to a property, full access to a property, no access to a property.

According to an embodiment, the person identity is retrieved from a property value of a direct property of the electronic object.

According to an embodiment, the person identity is retrieved from a property value of an indirect property of the electronic object.

According to an embodiment, the person identity is retrieved from a property value of such property, which has been added to complement the predefined metadata properties.

According to an embodiment, the request to access metadata of an electronic object comprises at least one of the following: viewing metadata of an electronic object, opening metadata of an electronic object, modifying metadata of an electronic object.

According to an embodiment, the determining one or more pseudo-users that are allowed to access the requested metadata of the electronic object comprises for each property in the requested metadata: detecting whether one or more pseudo-users are defined in the access settings for the property.

DESCRIPTION OF THE DRAWINGS

In the following, various embodiments of the invention will be described in more detail with reference to the appended drawings, in which.

DESCRIPTION OF EXAMPLE EMBODIMENTS

In the following, several embodiments of the invention will be described in the context of enterprise content management system (ECM). It is to be noted, however, that the invention is not limited to such a system. In fact, the different embodiments have applications in any environment where electronic objects accessible by multiple users are defined with metadata.

The present embodiments relate to controlling rights to access properties in electronic object's metadata. This means that certain users are given rights to read and/or edit (change, add and/or delete) property values in the metadata of electronic objects. The rights may be allocated to a single property of a certain electronic object rather than to a complete set of properties of an electronic object.

Figure 1:
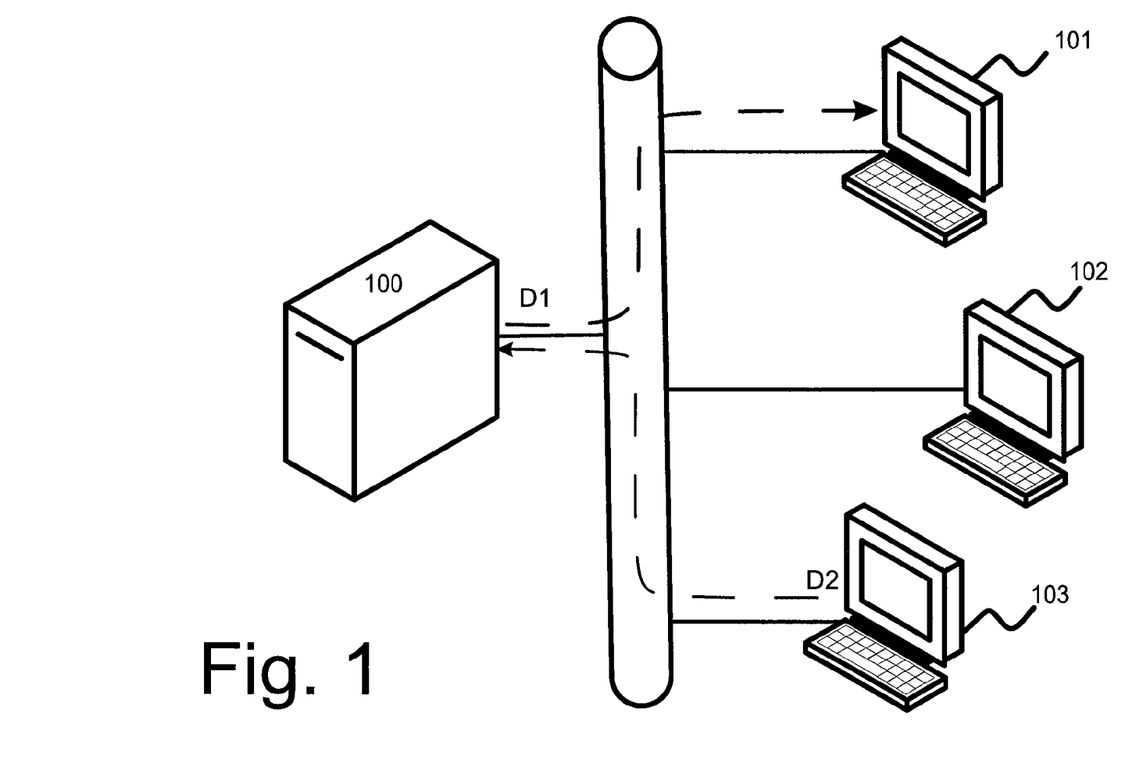
FIG. 1 shows an embodiment of an enterprise content management system.

FIG. 1 illustrates an example of an electronic content management system in a simplified manner. The ECM system comprises at least one server 100 for storing electronic objects such as documents. One or more client devices 101, 102, 103 can access said at least one server 100 in order to work with the stored electronic objects. In FIG. 1 example, the client device 101 retrieves a document D1, whereas the client device 103 stores a document D2 to the server 100. A document is an example of an electronic object. The client device can be any electronic device that is capable of retrieving (accessing) data via communication network. Examples of the client device are a personal computer, a laptop computer, a tablet computer, a mobile computer. The communication network can be any wired or wireless network that is capable of transferring data between a client and a server. As an alternative to one server in the system, the ECM may comprise more than one server. Such more than one server may comprise their own data storages, wherein the data in the data storages may be shared data, copied data or server's own data. Each client device and server(s) includes at least one non-transitory memory to store data and/or computer program code (see further details later in the Description).

The electronic objects comprise metadata (i.e. data about the data), wherein metadata refers to information on object's properties. A creator of a file, a creation date, a project, a responsible, a type of the object are examples of properties of an electronic object. As discussed, metadata is composed of two parts—a definition part and a content part. The definition part, "property definition", defines generally the type of property; client, project, customer, creator, date, etc. The content part, "property value", on the other hand specifies the value of the metadata, i.e. which client ("Earth Image Ltd"), which project ("The World"), which customer ("PhotoShoot Inc."), which creator ("Martha Stellina"), which date ("20120601"). For further example, specified values for a creator of the file or a creation date represent content of the metadata. In addition, a defined project which the electronic object belongs to; a defined client who owns the electronic object; a defined type of a document (letter, assignment, publication, order etc.); a defined name of the electronic object are examples of the content of metadata. Despite the plural form of metadata, in this disclosure, the term metadata may also refer to a singular form. Therefore, an object being defined by "metadata" may in practice be defined by one or more pieces (i.e. property or properties) of metadata. In the present disclosure, term "properties" is used as a synonym for metadata, wherein "a property" is a piece of a metadata. Further, the term "property definition" refers to the definition part of a property, and the term "property value" refers to the content part of a property. The term "property" may refer to either the definition part or the content part, or both.

Figure 2:
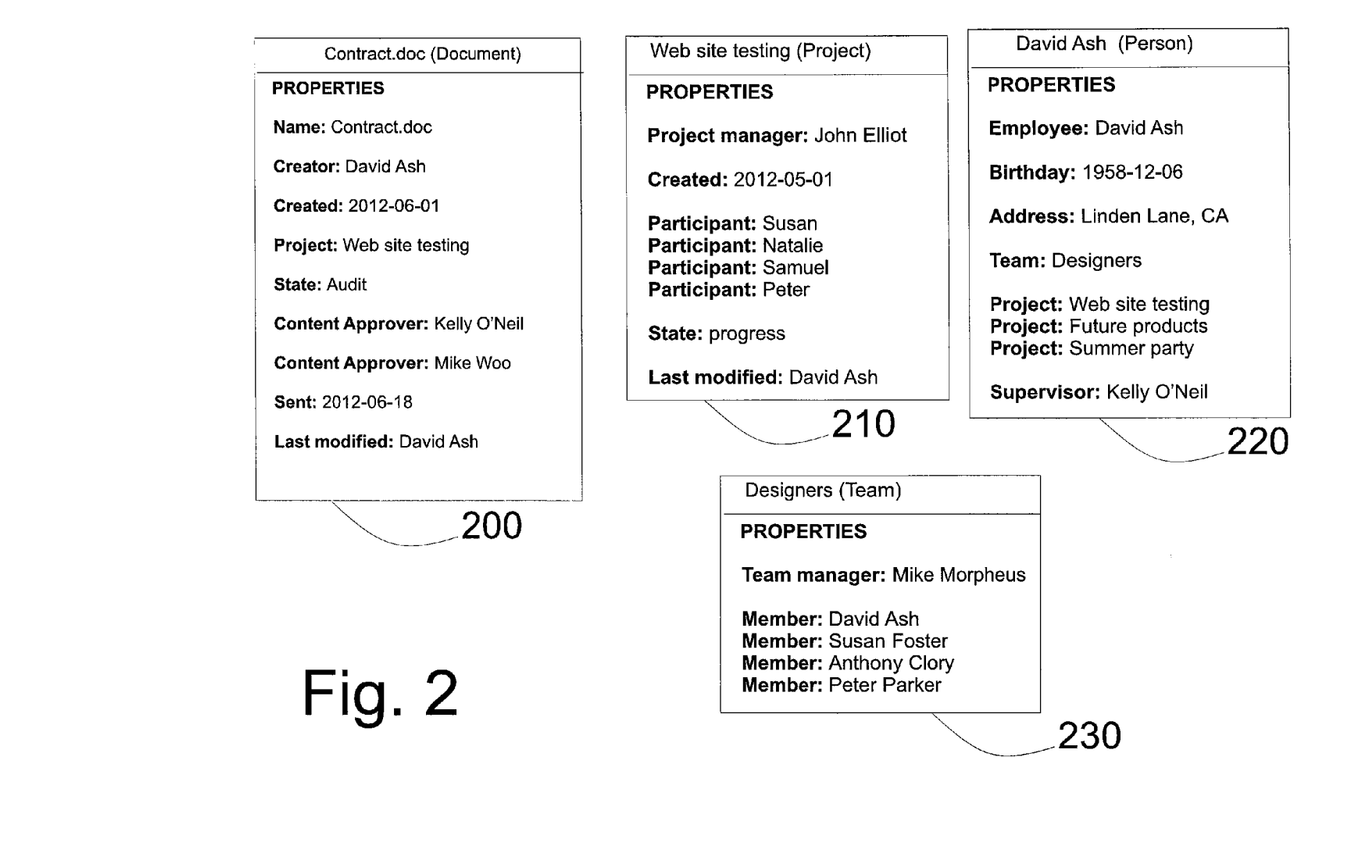
FIG. 2 shows embodiments of a metadata structure for electronic objects.

Direct metadata is a set of properties that define the electronic object directly. Direct metadata is therefore the properties of the object. Indirect metadata is a set of properties for a property of the electronic object. Therefore, indirect metadata does not define the electronic object, but the property of the electronic object. The indirect metadata is thus reachable via object's property. FIG. 2 illustrates examples of electronic objects 200, 210, 220, 230 and corresponding metadata. An electronic object being a document 200 has metadata that comprises properties such as "name", "creator", "created", "project", "state", "content approver", "sent", and "last modified". An electronic object being a project 210 has metadata comprising properties such as "project manager", "created", "participant", "state" and "last modified". An electronic object being a person 220 has metadata comprising properties such as "employee", "birthday", "address", "team", "project" and "supervisor". An electronic object being a team 230 has metadata comprising properties such as "team manager" and "member". Document's 200 properties listed in its metadata are document's direct metadata. Project's 210 properties listed in its metadata are project's direct metadata. However, project's 210 properties listed in its metadata are document's 200 indirect metadata. This is because the document 200 "contract.doc" has a property "Project" having a value "Web site testing" which refers to a project object 210 "Web site testing" having its own properties. Similarly, the metadata for a person object 220 "David Ash" is the direct metadata of the person object 220 "David Ash". In addition, the metadata for a team object 230 "Designers" is the indirect metadata for "David Ash" 220, because the value of the property "Team" in the object's 220 "David Ash" metadata refers to the object 230 "Designers". Indirection can have multiple levels. For example, a document object 200 has indirect metadata that is more than one level away from the document object's 200 direct metadata, e.g., the "Birthday" property of a person object 220 "David Ash" is such indirect metadata for the document object 200, because the document object 200 refers to a project object 210 via property "Project", and the project object 210 refers to the person object 220 via property "Last modified".

The purpose of the present embodiments is to improve the technical field by providing dynamic solution for controlling access to individual pieces of metadata (i.e. properties) and particularly in such a way that the access control depends on a value of a direct or an indirect property (i.e. piece of metadata) of the object. This means that "John" is capable of seeing a birthday of only such employees whose supervisor "John" is. The present embodiments provide a solution by means of which users are given rights to read and/or edit the property values. This means that certain users are given a right to view the property and the content therein, and certain users are not allowed to read the property. On the other hand, certain users may modify the content of the property, while certain users may not. Thus, the rights for property definitions are defined individually for each property.

Figure 3:
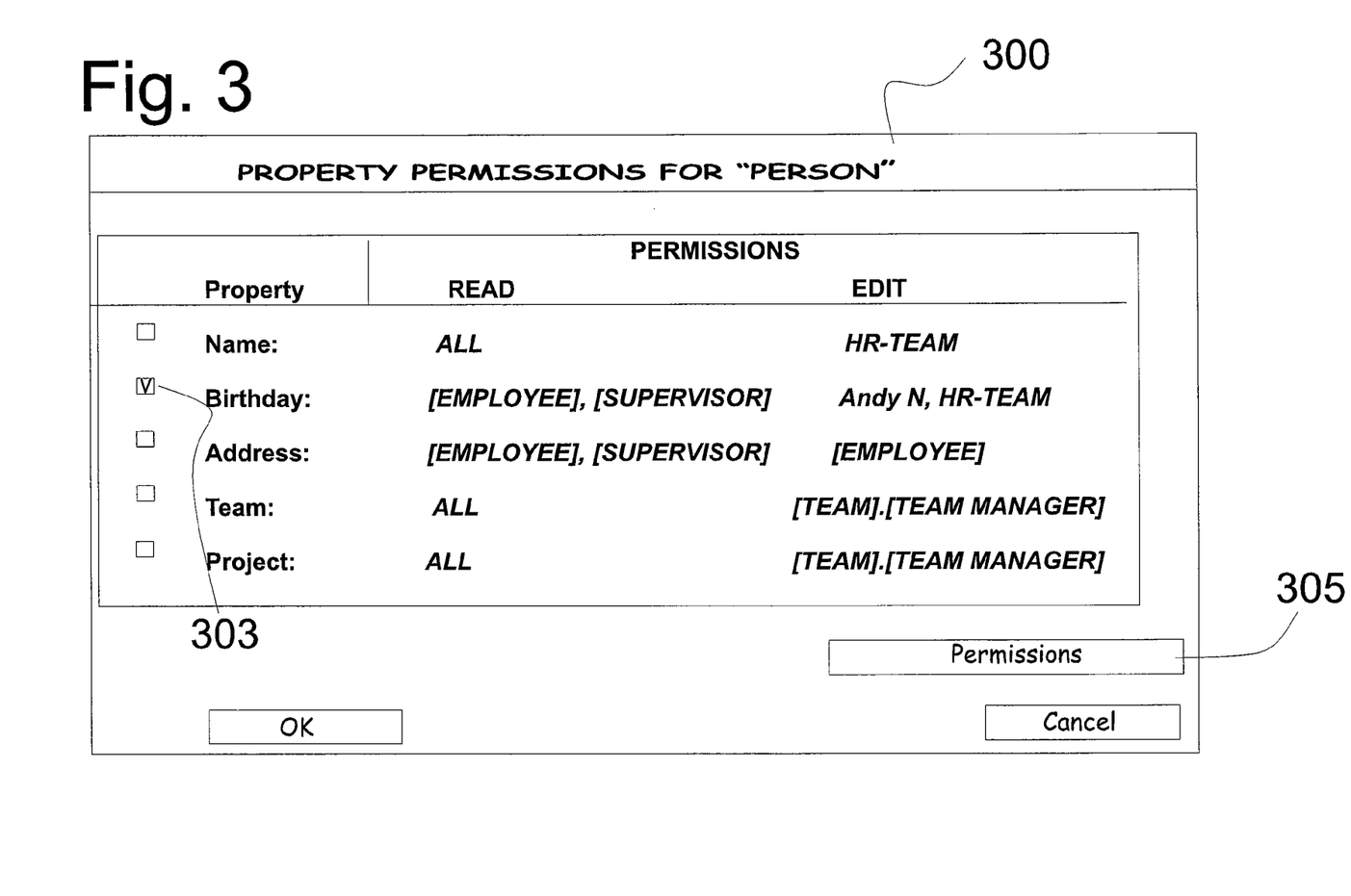
FIG. 3 shows an embodiment of a user interface view for property permissions for a certain electronic object.

FIG. 3 illustrates an example of a user interface view showing permissions for property definitions (i.e. a definition part of a property) for a certain type of electronic object. The property permissions view may list all the property definitions that are used for the electronic objects in the system (regardless of the type of the objects). Alternatively, the property permissions view may list only the property definitions that are relevant for a certain object type, as in FIG. 3 for object type "person". By ticking or selecting a property definition, such as property definition "birthday" 303, and selecting a button "Permissions" 305, the user may define who has rights and what kind of rights to the values of the property that the property definition in question defines. The task for controlling the access to the property values is, according to an example, available to and performed by only users who have administrator or "super user" access rights to the system. However, this can be adapted according to system requirements.

Figure 4:
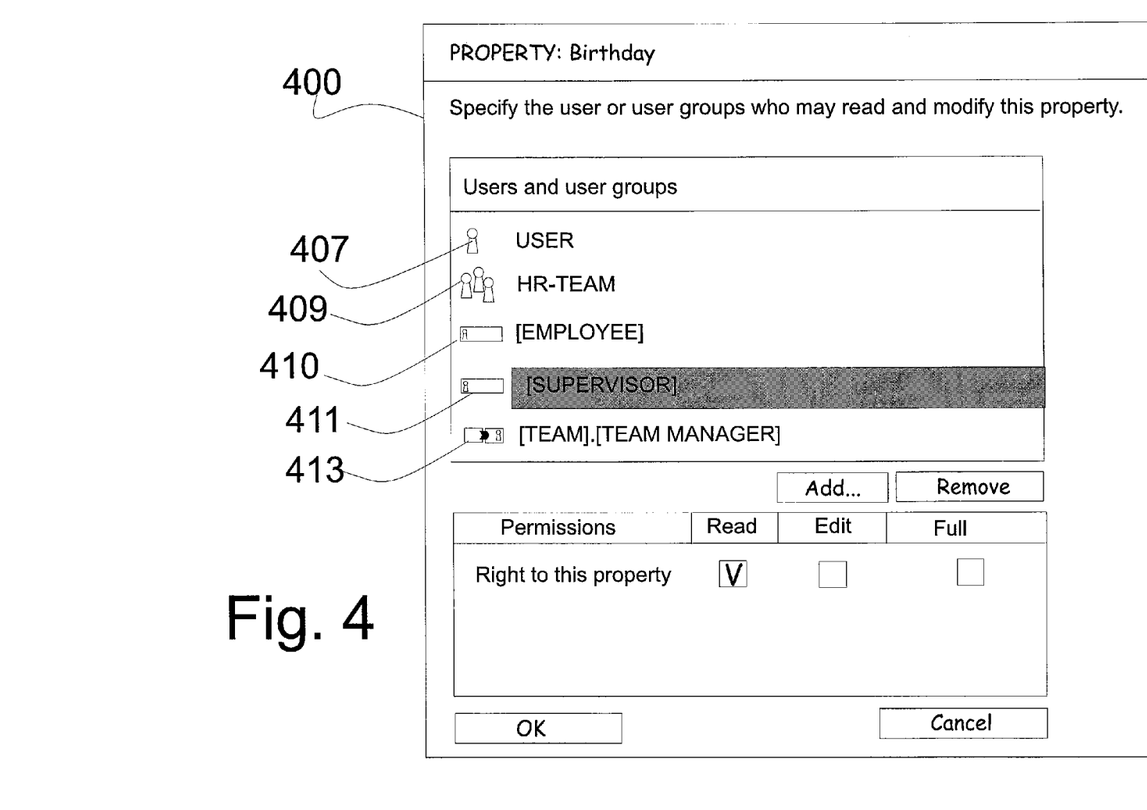
FIG. 4 shows an example of a user interface view for defining rights for a certain metadata property definition.

A user interface view 400 shown in FIG. 4 allows a user to define permissions for the selected property definition (being selected from a user interface shown in FIG. 3). In this example, the property definition is "Birthday", and the permissions specified will affect who can read/edit the values of the property "Birthday" and who cannot. It is appreciated that in this example, the rights for this property can be appointed directly to a user 407 which is to be specified when selected. In addition, the rights for this property can be appointed to a user group "HR-Team" 409, whereby rights are appointed to any user belonging to such user group. This kind of permission definition resembles traditional methods for appointing rights to a user or a user group.

In addition to specified users and user groups, according to embodiments of the present invention, the rights for this property can be appointed to so called pseudo-users. This means that some of the permitted users are defined as dynamic (i.e. metadata based) roles of the document management system, the true character of which are defined from direct or indirect metadata of the electronic object. Such a role without a defined person is called a pseudo-user. An example of notation for defining a pseudo-user based on direct metadata is "[Supervisor]". This can be read that "the right is given to a user whose name appears in a "Supervisor" property of the object in question". In addition, an example of notation for defining a pseudo-user based on indirect metadata is "[Team].[Team Manager]". This, on the other hand, can be read that "the right is given to a user whose name appears in a 'team manager' property of such team which is specified in a 'team' property of the object in question".

Now, turning to FIG. 4, it is realized that the rights may also be appointed to a user 410, i.e. a pseudo-user, who is defined as the property value of property "Employee" and to a user 411, i.e. a pseudo-user, who is defined as the property value of property "Supervisor" in object's direct metadata. Yet further, the rights for this property can be appointed to a user 413, i.e. a pseudo-user, who is defined as the property value of property "Team Manager" in the metadata of an object "Team" being defined in object's metadata. Such a user 413 is thus object's indirect metadata.

In the user interface view 400, there are shown permissions giving certain rights to users. However, the permission list may also deny rights from certain users. Therefore, in addition to rights "Read", "Edit", "Full", there can be a denial to a property by "Deny". In addition, any user not specified in the permission list (see FIG. 3) is implicitly not permitted to the property in question.

As an alternative to the user interface view 400, the permissions can be defined according to clause "allow read", "allow edit", "deny edit" etc. Therefore the permissions can be allocated directly to a certain operations. The complete permission clause would then be, for example:
[EMPLOYEE]=allow edit
user=allow read; deny edit The permission can also be defined with an implicit allowance flag, whereby an "allow"/"deny" option needs not to be used. In such a simplified approach, if a user is specified in the property permission list, then such a user has the right to access the property, and if a user is not specified in the property permission list, then such a user does not have a right to access the property.

By using the notation above, the rights for the properties "PERSON IDENTITY" and "SALARY" can be defined, for example, as follows:
PERSON IDENTITY:
"HR Department (group)=Full control"
"[EMPLOYEE]=Read"
"[EMPLOYEE].[SUPERVISOR]=Edit"
SALARY:
"HR Department (group)=Full control"
"[EMPLOYEE]=Read"
"[EMPLOYEE].[SUPERVISOR]=Edit"

It is to be noticed that the "HR Department" in the previous example is a user group having certain rights, and does not depend on the metadata values of the object. On the other hand, [EMPLOYEE] is a pseudo-user that can be determined from object's direct metadata. Similarly [EMPLOYEE].[SUPERVISOR] is a pseudo-user that can be determined from object's indirect metadata.

In addition, it is appreciated that the rights for the properties can be defined also from pseudo-user's point of view as follows:
[EMPLOYEE]:
Read=Person identity; Salary
Edit=Address
[EMPLOYEE].[SUPERVISOR]:
Edit=Person Identity; Salary This means that the rights of a pseudo-user are appointed to certain properties, whereas in the previous example, the rights for a certain property are appointed to one or more pseudo-users.

Yet another example of how the rights for the properties can be defined is as follows:
[EMPLOYEE]:
Person identity: Read
Salary: Read
Address: Edit
[EMPLOYEE].[SUPERVISOR]:
Person Identity: Edit
Salary: Edit Turning back to FIG. 3, it is realized that each property has been allocated with different rights. For example, the property "Name" can be shown to all users, but is modifiable only by the user belonging to a user group called "HR-team".

Property value of property "Birthday" can be modified by a user belonging to a user group "HR-team", but also by a specified user "Andy N". The property "Birthday" can be viewed by a pseudo-user [EMPLOYEE] being a user that is specified in the property "Employee" of the current object. Taking the example of FIG. 2, the person allowed to view David Ash's birthday, is David Ash himself. In addition, the property "Birthday" can be viewed by a pseudo-user [SUPERVISOR] being a user being defined in the "Supervisor" property of the electronic object "Person". Now, looking again FIG. 2, the other user able to see the "Birthday" property is Kelly O'Neill being defined as a supervisor in David Ash's metadata.

Further (see FIG. 3), property "Address" can be read by pseudo-users [EMPLOYEE] and [SUPERVISOR], which will have values from the corresponding properties of the electronic object "Person". In addition, a pseudo-user [EMPLOYEE] can modify the property "Address". Properties "Team" and "Project" are viewable by all users and modifiable by pseudo-user [TEAM].[TEAM MANAGER] being a user being defined as "Team manager" for the team being specified in electronic object's metadata. The team manager can thus be indirectly determined from an electronic object "Team" of the person in question. In FIG. 2 example the team "Designers" have team manager called Mike Morpheus, whereby Mike Morpheus can modify the values of "team" and "project" properties in the metadata of David Ash.

It is appreciated that nearly any property in the metadata of the electronic object may have more than one value. This means that a property "Supervisor" may define one or more users ("Susan" or "Susan", "Peter"), but also one or more user groups ("Administration") or any combination of them ("Susan", "Peter", "Administration"). Therefore also the permission to access properties will be appointed to one or more users, one or more user groups or any combination of those, depending on the value(s) of the property "Supervisor" of the current object.

Figure 5:
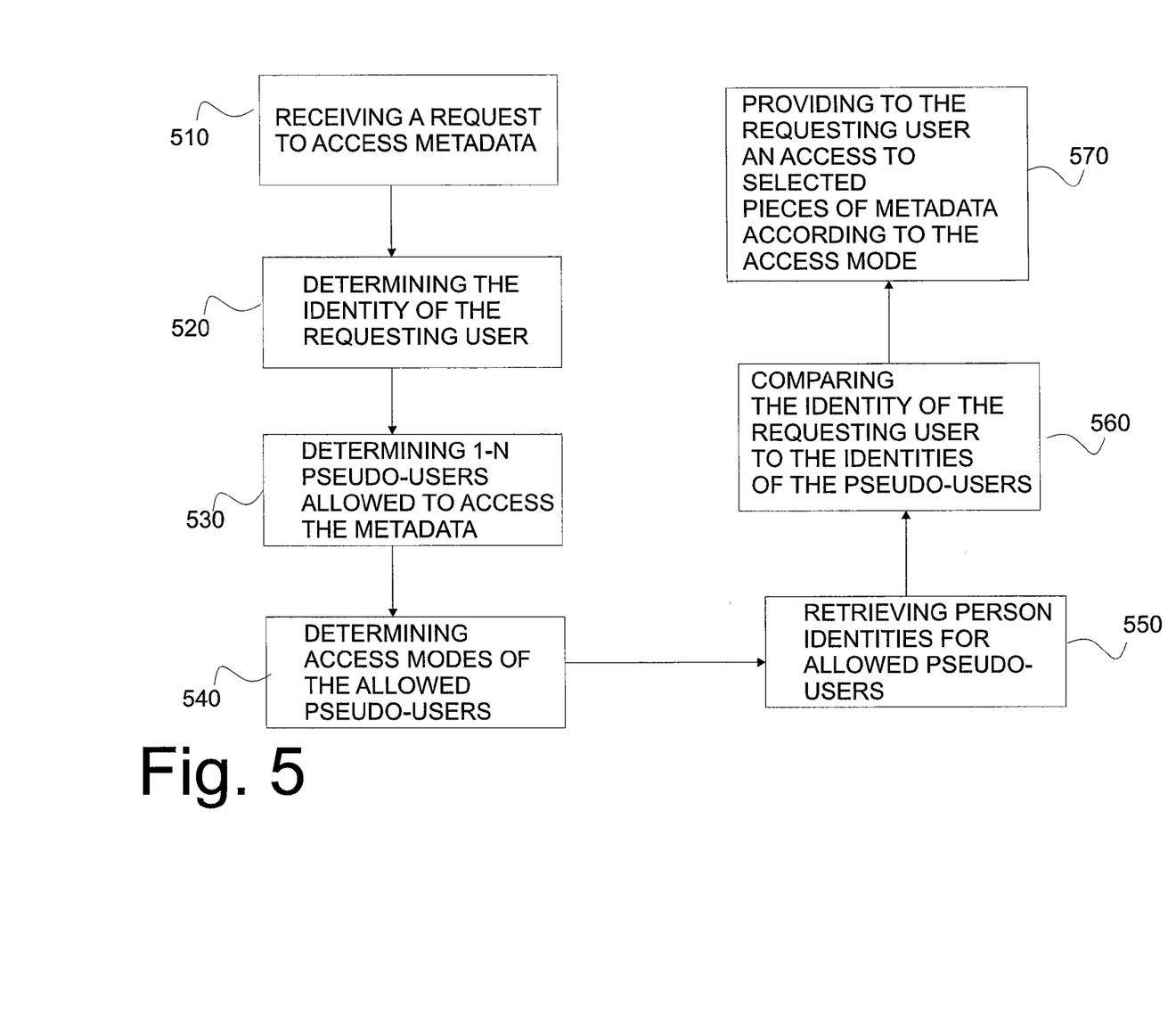
FIG. 5 shows an embodiment of a method for controlling access to metadata as a flowchart.

An example of the method is shown as a flowchart in FIG. 5. In this embodiment, the method comprises steps for receiving a request to access metadata (510), for determining the identity of the requesting user (520), for determining one or more pseudo-users allowed to access the requested metadata (530), for determining access modes of the allowed pseudo-users (540), for retrieving person identities for allowed pseudo-users from a metadata of the object having the requested metadata (550), for comparing the identity of the requesting user to the identities of the pseudo-users (560) and for providing to the requesting users an access to the selected pieces of metadata (i.e. properties) according to the access mode (570). The access mode can be determined from the permission list being defined to the system according to one of the embodiments being discussed above. The method can be utilized also when determining permissions according to traditional access right definitions. In such a case, steps 530-560 are replaced with steps for determining one or more users and user groups allowed to access the metadata; determining access modes of the allowed user and/or user groups; retrieving person identities for allowed user groups and comparing the identity of the requesting user to the identities of the allowed user and/or user groups. It is thus realized that the present embodiments do not necessarily replace the traditional methods, but may operate in parallel with them. Therefore, some of the rights may be appointed to certain users/user groups, while some of the rights are appointed to certain pseudo-users/pseudo-user groups.

Figure 6:
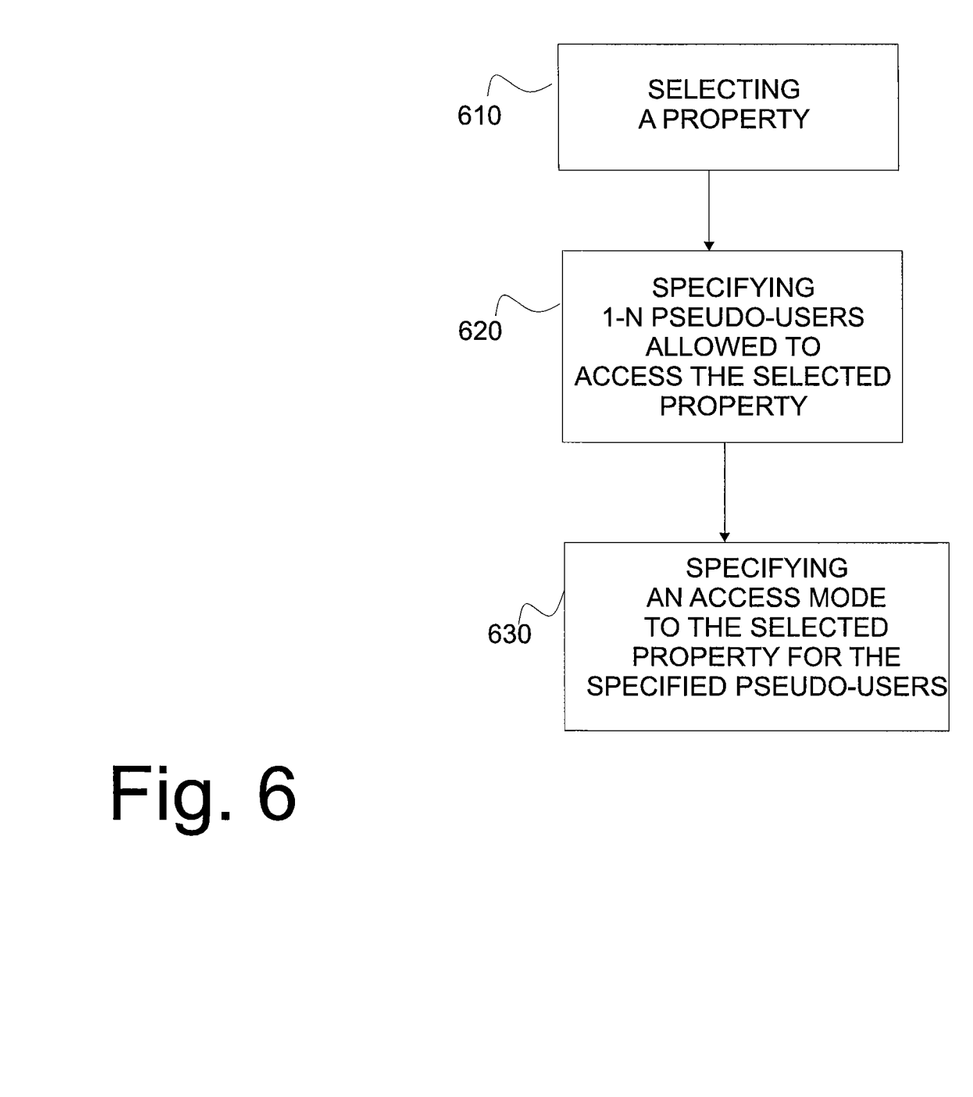
FIG. 6 shows an embodiment of a method for defining access to metadata as a flowchart.

It is appreciated that the present embodiments can be adapted in such a method where a user requests access to complete metadata, whereby only such properties are accessed to which the requesting user has rights. The present embodiments can also be adapted in such a method where a user requests access to an individual property of the metadata. In such a case, pseudo-users allowed to access such property are determined, and if the identity of the requesting user matches one of the determined pseudo-users, the requesting user is provided the access to said property. Also, the present embodiments cover a method for defining access to metadata of an electronic object. In such a method access settings are defined for at least one individual property of metadata. Defining such access settings comprises specifying one or more pseudo-users that are allowed to access said individual property of the metadata and the access mode to said individual property of the metadata. An embodiment of such a method is illustrated in FIG. 6.

The present embodiments have great advantages in the context of content and data management. For example, metadata of objects can easily and dynamically be controlled so that public parts of objects' metadata can be seen by all users, but private and/or classified data is not displayed to all users but only to a selected set of users. In addition, the rights may vary dynamically from one object to another depending on the metadata of the object in question. In traditional solutions, such definitions are made in a static manner, and the rights to e.g. read and edit a specific property such as "Birthday" do not vary dynamically from one object to another based on the property values in the metadata of the object in question or based on indirect metadata.

In addition, an advantage of the present embodiments is that the pseudo-users can be defined according to any metadata property. This means that in addition to predefined (or default) pseudo-users, also such pseudo-users can be utilized for property access which are based on a metadata property that has been added to complement the predefined properties in the metadata. Such added property can be defined by and tailored for the organization. This means that the organization may define a property called "Employee's supervisor" having varying values according to the object in question. Now, the organization may control the access to a property "Salary" according to the pseudo-user [EMPLOYEE'S SUPERVISOR]. Thus, the document management system may provide metadata with default properties, but the user (user organization) may tailor the default properties by adding other properties according to their needs. The present embodiments thus allows organization to define rights by using such added properties.

The various embodiments of the invention can be implemented with the help of computer program code that resides in a memory and causes the relevant apparatuses to carry out the invention. For example, a server device may comprise circuitry and electronics for handling, receiving and transmitting data, computer program code in a memory, and a processor that, when running the computer program code, causes the server device to carry out the features of an embodiment. Yet further, a client device may comprise circuitry and electronics for handling, receiving and transmitting data, computer program code in a memory, and a processor that, when running the computer program code, causes the client device to carry out the features of an embodiment.

It is apparent that the present invention is not limited solely to the above-presented embodiments, but it can be modified within the scope of the appended claims.

The invention claimed is:

1. A method for controlling access to metadata of an electronic object in a content management system comprising a client device and a server device, comprising:
    receiving a request from an identified user by the client device to access metadata of an electronic object being stored in the server device;
    determining one or more pseudo-users that are allowed to access the requested metadata of the electronic object and their corresponding access modes;
    utilizing the requested metadata to find one or more properties that correspond to the determined one or more pseudo-users, and retrieving at least one person identity from a property value of the found one or more properties;
    comparing the identity of the requesting identified user to the retrieved at least one person identity, and if there is a match;
    providing to the requesting identified user an access to only the selected properties in the metadata, which selected properties are determined according to the access mode.

2. The method according to claim 1, wherein the access mode defines at least one of the following: read access to a property, edit access to a property, full access to a property, no access to a property.

3. The method according to claim 1, wherein the person identity is retrieved from a property value of a direct property of the metadata of the electronic object.

4. The method according to claim 1, wherein the person identity is retrieved from a property value of an indirect property of the metadata of the electronic object.

5. The method according to claim 1, wherein the person identity is retrieved from a property value of such property, which has been added to complement the predefined metadata properties.

6. The method according to claim 1, wherein the request to access metadata of an electronic object comprises at least one of the following: viewing metadata of an electronic object, opening metadata of an electronic object, modifying metadata of an electronic object.

7. The method according to claim 1, wherein determining one or more pseudo-users that are allowed to access the requested metadata of the electronic object comprises for each property in the requested metadata: detecting whether one or more pseudo-users are defined in the access settings for the property.

8. A method for controlling access to metadata of an electronic object in a content management system comprising a client device and a server device, comprising:
receiving a request from an identified user by the client device to access a property in metadata of an electronic object being stored in the server device;
determining one or more pseudo-users that are allowed to access the requested property in metadata of the electronic object and their corresponding access modes;
utilizing the requested metadata to find one or more properties that correspond to the determined one or more pseudo-users, and retrieving at least one person identity from a property value of the found one or more properties;
comparing the identity of the requesting identified user to the retrieved at least one person identity, and if there is a match;
providing to the requesting identified user an access to only the selected properties in the metadata, which selected properties are determined according to the access mode.

9. The method according to claim 8, wherein the access mode defines at least one of the following: read access to a property, edit access to a property, full access to a property, no access to a property.

10. The method according to claim 8, wherein the person identity is retrieved from a property value of a direct property of the metadata of the electronic object.

11. The method according to claim 8, wherein the person identity is retrieved from a property value of an indirect property of the metadata of the electronic object.

12. The method according to claim 8, wherein the request to access a property in metadata of an electronic object comprises at least one of the following: viewing the property, opening the property, modifying the property.

13. A method for defining access to metadata of an electronic object, the method comprising
defining access settings for an individual property of metadata, wherein defining the access settings comprises specifying one or more pseudo-users that are allowed to access only said individual property of the metadata and an access mode to said individual property of the metadata, wherein identities of at least one person corresponding with said pseudo-users is to be retrieved from at least one property value of one or more properties, which one or more properties are found by utilizing the metadata of the object, said at least one person identity to be used to compare with an identity of an identified user requesting to access the metadata of the object.

14. The method according to claim 13, wherein the access mode defines at least one of the following: read access to a property, edit access to a property, full access to a property, no access to a property.

15. The method according to claim 13, wherein a pseudo-user is defined according to a property in metadata of the electronic object.

16. An apparatus comprising:
a computer processor and a computer memory operatively coupled to the computer processor, where the computer memory having disposed within it computer program code to cause the apparatus to perform at least the following:
receiving a request from an identified user to access metadata of an electronic object;
determining one or more pseudo-users that are allowed to access the requested metadata of the electronic object and their corresponding access modes;
utilizing the requested metadata to find one or more properties that correspond to the determined one or more pseudo-users, and retrieving at least one person identity from a property value of the found one or more properties;
comparing the identity of the requesting identified user to the retrieved at least one person identity, and if there is a match;
providing to the requesting user an access to only the selected properties of the metadata which selected properties are determined according to the access mode.

17. The apparatus according to claim 16, wherein the access mode defines at least one of the following: read access to a property, edit access to a property, full access to a property, no access to a property.

18. The apparatus according to claim 16, wherein the person identity is retrieved from a property value of a direct property of the metadata of the electronic object.

19. The apparatus according to claim 16, wherein the person identity is retrieved from a property value of an indirect property of the metadata of the electronic object.

20. The apparatus according to claim 16, wherein the person identity is retrieved from a property value of such property, which has been added to complement the predefined metadata properties.

21. The apparatus according to claim 16, wherein the request to access metadata of an electronic object comprises at least one of the following: viewing metadata of an electronic object, opening metadata of an electronic object, modifying metadata of an electronic object.

22. The apparatus according to claim 16, wherein for determining one or more pseudo-users that are allowed to access metadata of the electronic object, the apparatus further comprises computer program code configured to, with the processor, cause the apparatus to perform at least the following:
for each property in the metadata: detecting whether one or more pseudo-users are defined for the property.

23. An apparatus comprising:
a computer processor and a computer memory operatively coupled to the computer processor, where the computer memory having disposed within it computer program code to cause the apparatus to perform at least the following:
receiving a request from an identified user to access a property in metadata of an electronic object;
determining one or more pseudo-users that are allowed to access the property in metadata of the electronic object and their corresponding access modes;
utilizing the requested metadata to find one or more properties that correspond to the determined one or more pseudo-users, and retrieving at least one person identity from a property value of the found one or more properties;
comparing the identity of the requesting identified user to the retrieved at least one person identity, and if there is a match;
providing to the requesting identified user an access to only the selected properties in the metadata, which selected properties are determined according to the access mode.

24. The apparatus according to claim 23, wherein the access mode defines at least one of the following: read access to a property, edit access to a property, full access to a property, no access to a property.

25. The apparatus according to claim 23, wherein the person identity is retrieved from a property value of a direct property of the metadata of the electronic object.

26. The apparatus according to claim 23, wherein the person identity is retrieved from a property value of an indirect property of the metadata of the electronic object.

27. The apparatus according to claim 23, wherein the request to access a property in metadata of an electronic object comprises at least one of the following: viewing the property, opening the property, modifying the property.

28. An apparatus comprising:
   a computer processor and a computer memory operatively coupled to the computer processor, where the computer memory having disposed within it computer program code to cause the apparatus to perform at least the following:
   defining access settings for an individual property of metadata, wherein defining the access settings comprises specifying one or more pseudo-users that are allowed to access only said individual property of the metadata and an access mode to said individual property of the metadata, wherein identities of at least one person corresponding with said pseudo-users is to be retrieved from at least one property of one or more properties, which one or more properties are found by utilizing the metadata of the object, said at least one person identity to be used to compare with an identity of an identified user requesting to access the metadata of the object.

29. The apparatus according to claim 28, wherein the access mode defines at least one of the following: read access to a property, edit access to a property, full access to a property, no access to a property.

30. The apparatus according to claim 29, wherein a pseudo-user is defined according to a property in metadata of the electronic object.

31. A computer program product embodied on a non-transitory computer readable medium, comprising computer program code configured to, when executed on at least one processor, cause an apparatus or a system to:
   receive a request from an identified user to access metadata of an electronic object;
   determine one or more pseudo-users that are allowed to access the requested metadata of the electronic object and their corresponding access modes;
   utilize the requested metadata to find one or more properties that correspond to the determined one or more pseudo-users, and retrieving at least one person identity from a property value of the found one or more properties;
   compare the identity of the requesting identified user to the retrieved at least one person identity, and if there is a match;
   provide to the requesting identified user an access to only the selected properties in the metadata, which selected properties are determined according to the access mode.

32. A computer program product embodied on a non-transitory computer readable medium, comprising computer program code configured to, when executed on at least one processor, cause an apparatus or a system to:
   receive a request from an identified user to access a property in metadata of an electronic object;
   determine one or more pseudo-users that are allowed to access the requested property in metadata of the electronic object and their corresponding access modes;
   utilize the requested metadata to find one or more properties that correspond to the determined one or more pseudo-users, and retrieving at least one person identity from a property value of the found one or more properties;
   compare the identity of the requesting identified user to the retrieved at least one person identity, and if there is a match;
   provide to the requesting identified user an access to only the requested property according to the access mode.

33. A computer program product embodied on a non-transitory computer readable medium, comprising computer program code configured to, when executed on at least one processor, cause an apparatus or a system to:
   define access settings for an individual property of metadata, wherein defining the access settings comprises specifying one or more pseudo-users that are allowed to access only said individual property of the metadata and an access mode to said individual property of the metadata, wherein identities of at least one person corresponding with said pseudo-users is to be retrieved from at least one property value of one or more properties, which one or more properties are found by utilizing the metadata of the object, said at least one person identity to be used to compare with an identity of an identified user requesting to access the metadata of the object.

* * * * *